(No Model.)
E. E. HARDY.
TERRET WITH SEPARABLE SHANK.
No. 404,403. Patented June 4, 1889.
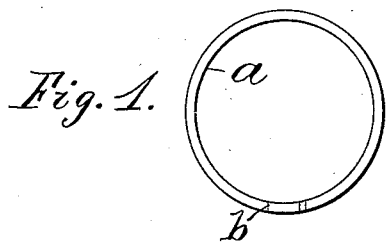
Fig. 1.
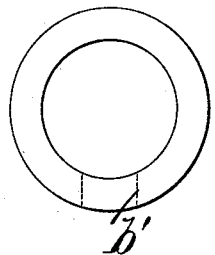
Fig. 7.
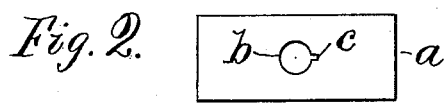
Fig. 2.
Fig. 8.
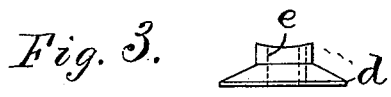
Fig. 3.
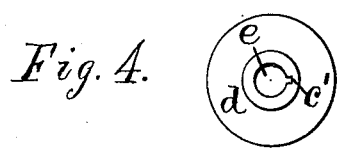
Fig. 4.
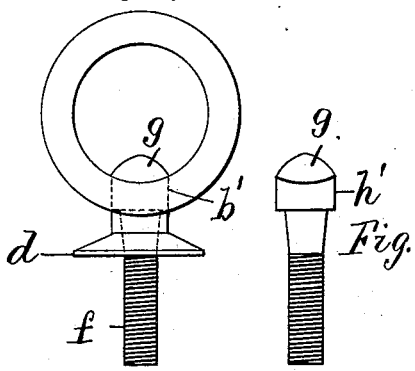
Fig. 9.
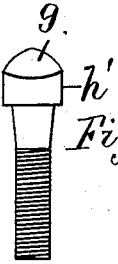
Fig. 10.
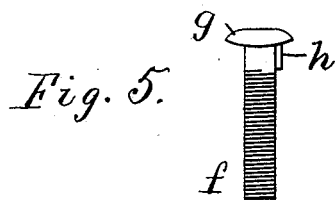
Fig. 5.
Fig. 11.
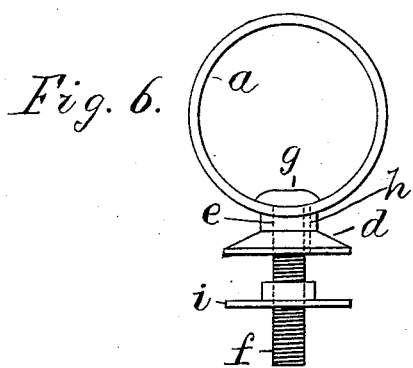
Fig. 6.
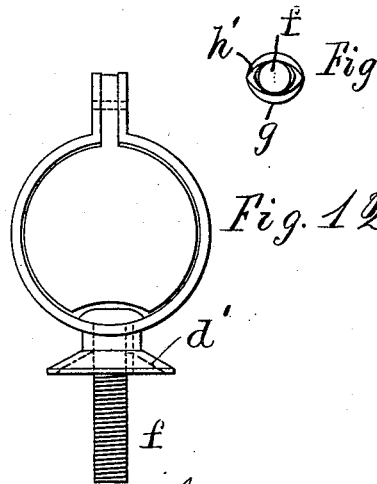
Fig. 12.
Attest:
L. Lee.
F. C. Fischer.
Inventor.
Emery E. Hardy per
Crane & Miller, Attys.

UNITED STATES PATENT OFFICE.

EMERY E. HARDY, OF NEWARK, NEW JERSEY.

TERRET WITH SEPARABLE SHANK.

SPECIFICATION forming part of Letters Patent No. 404,403, dated June 4, 1889.

Application filed October 12, 1888. Serial No. 287,928. (No model.)

*To all whom it may concern:*

Be it known that I, EMERY E. HARDY, a citizen of the United States, residing at Newark, Essex county, New Jersey, have invented certain new and useful Improvements in Terrets with Separate Shanks, fully described and represented in the following specification and the accompanying drawings, forming a part of the same.

The invention consists in a terret having a ring or eye formed separate from the collar or shank. This construction is very desirable for two reasons—first, that the collar and ring may be much more readily filed up or polished by suitable means when it is made separately, and secondly, for the reason that the ring may be very cheaply formed by cutting plain collars from the end of a tube, and providing them with a suitable shank by a through-bolt operating to connect them together at the same time that it holds them upon the saddle or tree.

The ring in my invention may be made round, or of any of the fancy shapes that have been employed in fly-terrets, and the collar or shank of the ring may be made of any desired form or material. Three forms of ring are shown in the annexed drawings, in which—

Figure 1 represents a ring formed of a piece of plain cylindrical tube. Fig. 2 is a bottom view of the same. Fig. 3 is an edge view, and Fig. 4 a plan, of a collar fitted to the same. Fig. 5 is a side view of a through-bolt adapted to secure such ring and collar together and to the saddle-tree. Fig. 6 shows the same parts connected together, with a nut applied to the stem of the bolt. Fig. 7 represents a ring of round or wire-like section. Fig. 8 is a view of the under side of the same. Fig. 9 represents a terret formed with such ring and a collar like that shown in Fig. 3. Fig. 10 shows an alternative construction for the through-bolt as applied to the terret in Fig. 9. Fig. 11 is an end view of the same bolt, and Fig. 12 is an elevation of a fly-terret having collar and bolt similar to those shown in Figs. 3 and 5.

In Figs. 1 to 6, $a$ is the ring; $b$, a hole formed through the bottom side of the same; $c$, a notch or keyway in the side of such hole. $d$ is the collar formed with hole $e$ in the center and notch $c'$ like the notch $c$. $f$ is the stem of the through-bolt, $g$ the head, and $h$ a feather upon the side of the head to fit the notches $c$ and $c'$. By such construction the ring and collar are adapted to turn the bolt for screwing it into the nut when applied to the saddle-tree, and the whole construction thus operates the same as if the collar and bolt were made integral with the ring, as in other cases. The collar is preferably hollowed upon the upper side, as shown in Fig. 3, to fit the under side of the ring $a$, and when the collar and ring are placed together, as shown in Fig. 6, with the bolt inserted through apertures $b$ and $e$, the terret is complete, and may be clamped upon the saddle-tree by the nut $i$, in the usual manner.

Rings like that shown in Figs. 1 and 2 may be very cheaply formed by cutting transverse sections from a polished tube of metal, and they may thus be made and finished fit for use much more cheaply than if formed by the rough process of casting with the collar or shank attached. The exterior of the ring may obviously be polished by spinning it upon a mandrel, which cannot possibly be done when a shank or collar is projected from one side thereof, and in like manner the interior of the ring may be polished with much greater facility if destitute of any projection like the head of the bolt shown in Fig. 6. Such projections are frequently desirable as ornaments to the interior of the ring, and may be readily applied by forming them as the head of the through-bolt, while the ring itself is placed upon its interior and thus more cheaply finished.

The cross-section of the ring $i$ (shown in Figs. 7 and 9) is round like a bit of wire, and swelled at the bottom to receive a hole $b'$ for the through-bolt. The hole $b'$ is shown of oval section, and the neck of the bolt to fit the same is shown in Figs. 10 and 11, provided with projections $h'$ at its opposite edges, which form feathers to engage the opposite sides of the hole $b'$. The collar $d$ (shown in Fig. 9) would in such case be made with an oval hole, and that portion of the bolt fitted to such hole would also be made oval to operate as a feather when inserted within the same. The head of the bolt is shown in Figs. 5 and 6 nearly flat, but is shown rounded in Figs. 9 and 10, and may be made of any other desired form. It will therefore be understood that the term "feather" is used herein to designate any projection upon the bolt adapted to engage the ring, as the sole function of such projection is to turn the bolt by means of the ring when screwing the terret fast to the saddle-tree.

Fig. 12 shows a fly-terret having its ring formed with a hole, and provided with a collar and through-bolt similar to that shown in Fig. 6.

The collar may be made of any material, as cast or sheet metal, and may be formed as a hollow shell by stamping the same from a flat piece of sheet metal, as indicated by the dotted lines $d'$ in Fig. 12.

I am aware of United States Patent No. 266,881, which shows a terret-ring having a screw-shank formed integral therewith and projecting from one side of it, and a base portion provided with an aperture through which the said shank passes and having hemispherical jaws at one end to grasp that portion of the terret-ring adjacent to the screw-shank. I am also aware of United States Patent No. 350,712, which shows a terret-ring having an aperture in one side and the remaining portions of the terret being formed integral and consisting in a screw-shank, a pin or rivet, and an intermediate shoulder, the said pin being riveted into the aperture in the terret-ring. I hereby disclaim the said patents and the constructions shown therein, limiting myself to the construction shown and described herein.

Having thus set forth my invention, what I claim herein is—

1. A terret having a ring provided with an aperture in one side, a collar formed in a separate piece, and a through-bolt inserted through the ring and collar, the several parts of the terret being detachable from one another, substantially as shown and described.

2. A terret having a ring and collar united by a through-bolt provided with a feather to hold the bolt from turning in the side of the ring.

In testimony whereof I have hereunto set my hand in the presence of two subscribing witnesses.

EMERY E. HARDY.

Witnesses:
THOS. S. CRANE,
HENRY J. MILLER.